(12) United States Patent
Fujino

(10) Patent No.: US 8,521,525 B2
(45) Date of Patent: Aug. 27, 2013

(54) COMMUNICATION CONTROL APPARATUS, COMMUNICATION CONTROL METHOD, AND NON-TRANSITORY COMPUTER-READABLE MEDIUM STORING A COMMUNICATION CONTROL PROGRAM FOR CONVERTING SOUND DATA INTO TEXT DATA

(75) Inventor: Hiroaki Fujino, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 835 days.

(21) Appl. No.: 12/659,228

(22) Filed: Mar. 1, 2010

(65) Prior Publication Data
US 2010/0250249 A1    Sep. 30, 2010

(30) Foreign Application Priority Data
Mar. 26, 2009    (JP) .................. 2009-075766

(51) Int. Cl.
*G10L 15/00*    (2013.01)
(52) U.S. Cl.
USPC .......................................... 704/235; 704/231
(58) Field of Classification Search
USPC ................................. 704/230–257
See application file for complete search history.

(56) References Cited

U.S. PATENT DOCUMENTS

| | | | |
|---|---|---|---|
| 5,949,886 A * | 9/1999 | Nevins et al. | 381/57 |
| 6,947,892 B1 * | 9/2005 | Bauer et al. | 704/233 |
| 7,236,580 B1 * | 6/2007 | Sarkar et al. | 379/202.01 |
| 2005/0135583 A1 * | 6/2005 | Kardos | 379/142.01 |
| 2005/0209848 A1 | 9/2005 | Ishii | |

FOREIGN PATENT DOCUMENTS

| | | |
|---|---|---|
| JP | A-10-013556 | 1/1998 |
| JP | A-2002-344915 | 11/2002 |
| JP | A-2003-189273 | 7/2003 |
| JP | A-2005-277462 | 10/2005 |
| JP | A-2006-145791 | 6/2006 |
| JP | A-2008-042386 | 2/2008 |

OTHER PUBLICATIONS

Jan. 15, 2013 Office Action issued in Japanese Patent Application No. 2009-075766 (with translation).

* cited by examiner

*Primary Examiner* — Samuel G Neway
(74) *Attorney, Agent, or Firm* — Oliff & Berridge, PLC

(57) ABSTRACT

A communication control apparatus for communicating sound and image with another communication control apparatus via a network, includes a sound input device that acquires sound data from a sound of a user's speech, a level measuring device that measures a volume level of sound data input from the sound input device, a first determining device that determines whether the volume level measured by the level measuring device is smaller than a predetermined standard volume value, a sound recognizing device that executes sound reorganization of the sound data so as to create text data when the first determining device determines that the volume level is smaller than the standard volume value, and a transmitting device that transmits the text data created by the sound recognizing device to the another communication control apparatus.

20 Claims, 14 Drawing Sheets

| FACIAL FEATURE TABLE | | | |
|---|---|---|---|
| TERMINAL ID | USER ID | FACIAL FEATURE DATA | NAME |
| TERMINAL A | 1 | EYE 1, NOSE 1, MOUTH 1 | AAA |
| TERMINAL A | 2 | EYE 2, NOSE 2, MOUTH 2 | BBB |
| TERMINAL A | 3 | EYE 3, NOSE 3, MOUTH 3 | CCC |
| TERMINAL B | 4 | EYE 4, NOSE 4, MOUTH 4 | DDD |
| TERMINAL B | 5 | EYE 5, NOSE 5, MOUTH 5 | EEE |
| TERMINAL B | 6 | EYE 6, NOSE 6, MOUTH 6 | FFF |

COMMUNICATION CONTROL APPARATUS, COMMUNICATION CONTROL METHOD, AND NON-TRANSITORY COMPUTER-READABLE MEDIUM STORING A COMMUNICATION CONTROL PROGRAM FOR CONVERTING SOUND DATA INTO TEXT DATA

CROSS-REFERENCE TO RELATED APPLICATION

This Application claims priority from JP2009-075766, filed on Mar. 26, 2009, the content of which is hereby incorporated by reference.

BACKGROUND

The present disclosure relates to a communication control apparatus, a communication control method, and a computer-readable medium storing a communication control program. More specifically, the disclosure relates to a communication control apparatus and a communication control method that can convert sound data into text data so as to transmit it, and a computer-readable medium storing a communication control program.

Conventionally, communication control apparatus which communicates and performs conference between a pieces of communication control apparatus via networks, are known. Further, communication control apparatus which transmits and receives image and sound, and performs video conference between a plurality of terminals are known. Some of these apparatus which transmits text data in addition to sound so that contents spoken by conference participant in the past can be visually referred to, are known.

The above apparatus creates text data based on the input sound data and displays them in chronological order. As a result, the contents spoken in the past can be visually referred to, and closer communication is made possible, therefore the conference can be smooth and efficient.

SUMMARY

However, when a speaker's voice is low, a listener who receives the voice by the communication control apparatus occasionally turns up the volume of the sound. Recently, the video conference can be held not in a closed space such as a dedicated room for video conference, but in open space or the like. In this case, even when a speaker intentionally talks in a low voice about contents desired to be shared only with a listener, the listener turns up the volume of the sound of the communication control apparatus despite speaker's intention, and thus people around the listener can possibly hear the contents of the speaker's speech. When text data converted from the speaker's speech is always transmitted in addition to the sound such as above apparatus, a problem that communication efficiency is deteriorated arises. Further, when an image is transmitted, display of the text data makes it hard for listener to see the image.

To solve the above problems, it is an object of the present disclosure to provide a communication control apparatus, a communication control method, and a computer-readable medium storing a communication control program that can convert sound data of the speaker's speech into text data to transmit it only when it is necessary according to a speaker's speaking state.

To solve the problems described above, in a first aspect of this disclosure, a communication control apparatus for communicating sound and image with another communication control apparatus via a network, includes a sound input device that acquires sound data from a sound of a user's speech; a level measuring device that measures a volume level of sound data input from the sound input device; a first determining device that determines whether the volume level measured by the level measuring device is smaller than a predetermined standard volume value; a sound recognizing device that executes sound reorganization of the sound data so as to create text data when the first determining device determines that the volume level is smaller than the standard volume value; and a transmitting device that transmits the text data created by the sound recognizing device to the another communication control apparatus.

To solve the problems described above, in a second aspect of this disclosure, communication control method performed by a communication control apparatus for communicating sound and image with another communication control apparatus via a network, includes a level detecting step of detecting a volume level of input sound data input from a sound input device; a first determining step of determining whether the volume level detected at the level detecting step is smaller than a predetermined standard volume value; a sound recognizing step of recognizing sound of the sound data so as to create text data when it is determined that the volume level is smaller than the standard volume value at the first determining step; and a transmitting step of transmitting the text data created at the sound recognizing step to the another communication control apparatus.

To solve the problems described above, in a third aspect of this disclosure, a computer-readable medium storing a communication control program executed by a communication control apparatus for communicating sound and image with another communication control apparatus via a network, the communication control program comprising instructions for executing a method including the following steps performed by a computer of the communication control apparatus: a level detecting step of detecting a volume level of input sound data; a first determining step of determining whether the volume level detected at the level detecting step is smaller than a predetermined standard volume value; a sound recognizing step of recognizing sound of the sound data so as to create text data when it is determined that the volume level is smaller than the sound standard value at the first determining step; and a transmitting step of transmitting the text data created at the sound recognizing step to the another communication control apparatus.

BRIEF DESCRIPTION OF THE DRAWINGS

Exemplary embodiments of the invention will be described below in detail with reference to the accompanying drawings in which:

FIG. 11 is a pattern diagram showing a structure of a facial feature table;

DETAILED DESCRIPTION OF THE EXEMPLARY EMBODIMENTS

Description will be given below of a communication control system 1 according to one embodiment of the present disclosure with reference to the drawings. An outline of the communication control system 1 will be described with reference to FIG. 1.

Figure 1:
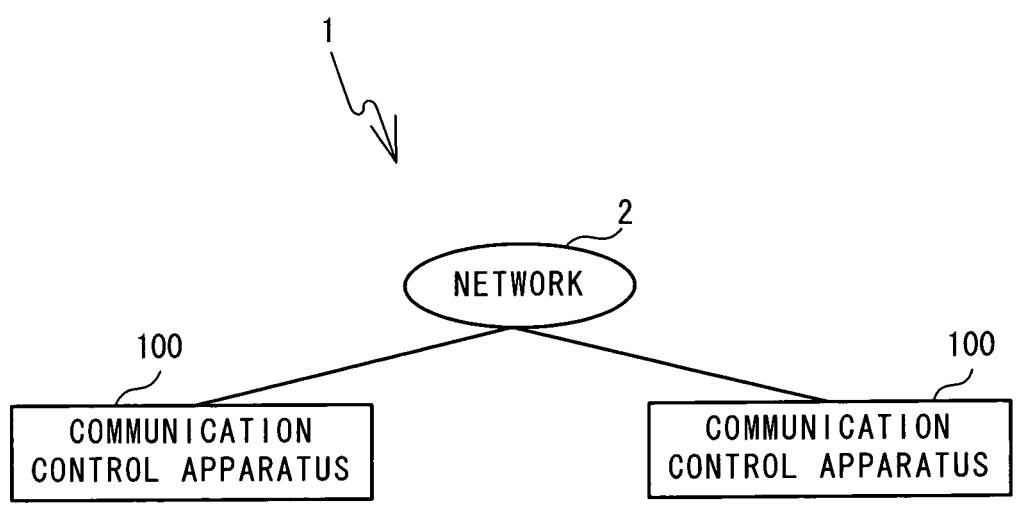
FIG. 1 is a diagram showing one example of a connected form of a communication control system.

The communication control system 1 is composed of a plurality of communication control apparatus 100 that are connected via a network 2. In the communication control system 1, image data and sound data are transmitted and received between the communication control apparatus 100 via the network 2, so that video conference takes place. FIG. 1 shows two communication control apparatus 100, but according to the present disclosure, the video conference may take place between two or more communication control apparatus 100 via the network 2, and the number of the communication control apparatus 100 may be two or more. The communication control apparatus 100 comprising the communication control system 1 may be equipped in one site of a certain company, or may be equipped in remote business establishments, or remote areas or countries. The communication control apparatus 100 is, for example, a publicly-known personal computer, and a general-purpose apparatus.

Figure 2:
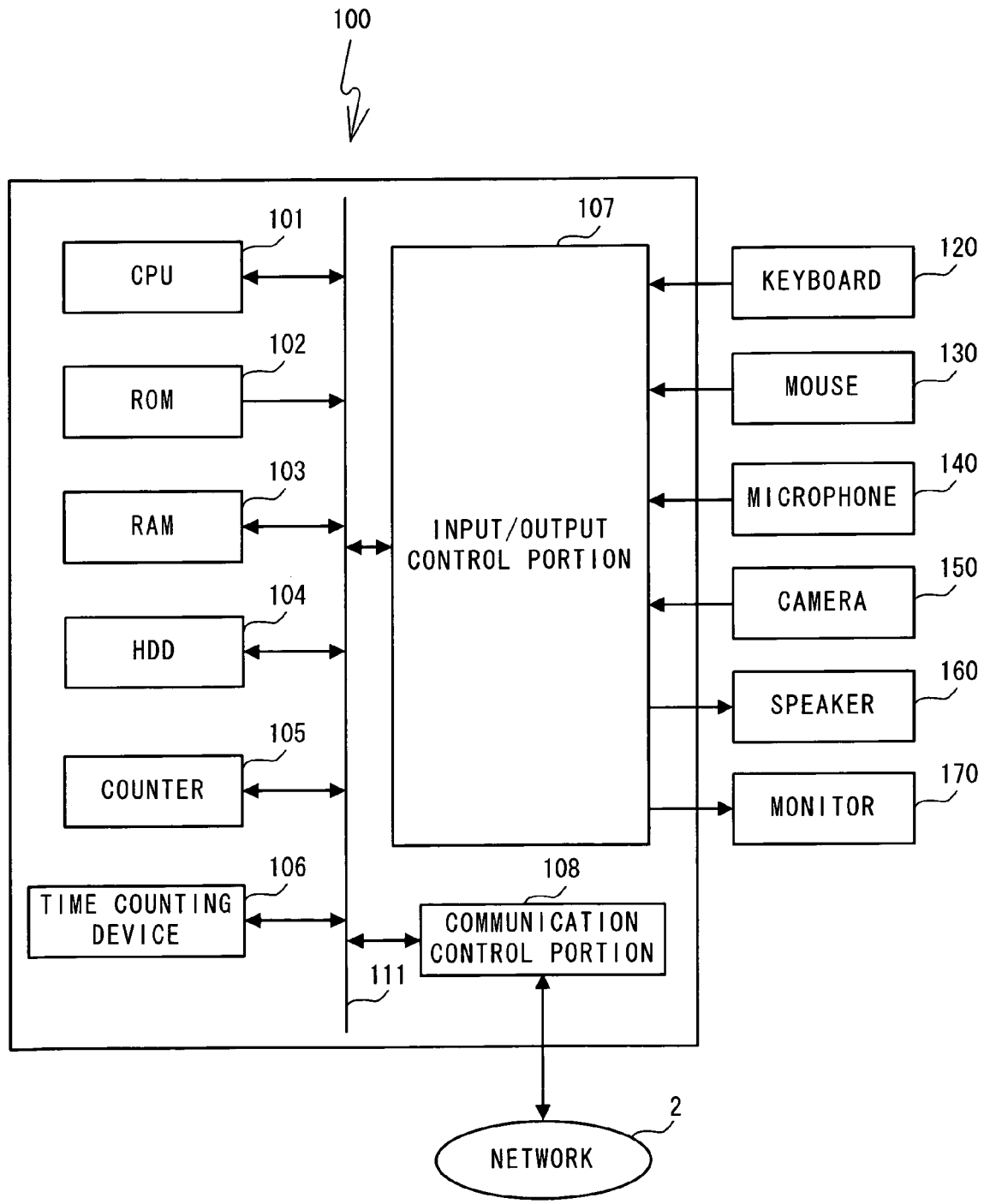
FIG. 2 is a block diagram showing an electrical configuration of a communication control apparatus.

An electrical configuration of the communication control apparatus 100 will be described with reference to the block diagram in FIG. 2. The communication control apparatus 100 has a CPU 101 that controls the communication control apparatus 100. The CPU 101 is connected to a ROM 102, a RAM 103, a hard disk drive (HDD) 104, a counter 105, a time counting device 106, an input/output control portion 107, and a communication control portion 108 via a bus 111.

The ROM 102 stores a program and set value for actuating the BIOS executed by the CPU 101. The RAM 103 temporarily stores various data. The HDD 104 stores various programs or the like to be executed in the communication control apparatus 100. The counter 105 serves as a timer and counts time. The time counting device 106 counts time as an internal clock.

The input/output control portion 107 is connected to a keyboard 120, a mouse 130, a microphone 140, a camera 150, a speaker 160, and a monitor 170. The keyboard 120 and the mouse 130 are used to input user's operation. The microphone 140 acquires sound from user's speech. The camera 150 acquires an image to be used for video conference. The speaker 160 outputs sound data transmitted from other communication control apparatus 100 when video conference takes place. The monitor 170 displays image data transmitted from the other communication control apparatus 100 when video conference takes place. The communication control portion 108 controls transmission/reception of data with the other communication control apparatus 100 via the network 2.

Figure 3:
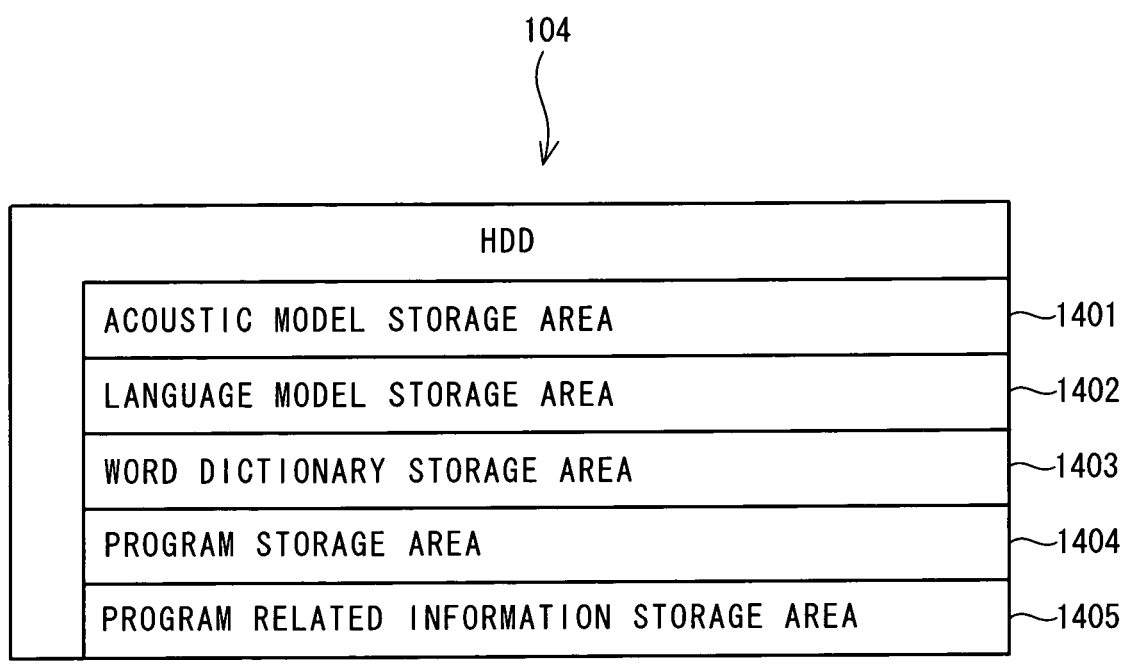
FIG. 3 is a pattern diagram showing a constitution of a storage area of HDD of the communication control apparatus.

Various storage areas of the HDD 104 will be described with reference to FIG. 3. The HDD 104 as a storage device has a plurality of storage areas. The plural storage areas include, for example, an acoustic model storage area 1401, a language model storage area 1402, a word dictionary storage area 1403, a program storage area 1404, and a program related information storage area 1405.

The acoustic model storage area 1401 stores a publicly-known acoustic model to be used in a voice recognizing process. The acoustic model (its detailed description is omitted) is obtained by statistically modeling an acoustic feature (for example, mel cepstrum) of a sound, and vowels and consonants are expressed by an amount of characteristic and corresponding phoneme.

The language model storage area 1402 stores a language model to be used in the sound recognizing process. The language model defines restrictions relating to connection between words, namely, linkage between words. The typical language model includes, for example, a descriptive grammar model for describing binding between words through grammar, and a statistic model for defining linkage between words by means of probability.

A typical example of the statistic model is word N-gram model. The word N-gram model is based on a hypothesis such that generation of i-th word $w_i$ of a word string P ($w_1, w_2 \ldots w_n$) depends on an adjacent (N−1) word. In the sound recognizing process using the statistic model represented by the word N-gram model, a word string and its occurrence probability as recognition results are output. In the embodiment, the statistic model is adopted as the language model, but the statistic model does not have to be always used, and thus the descriptive grammar model may be used.

The word dictionary storage area 1403 stores a word dictionary (not shown) to be used in the sound recognizing process. The word dictionary includes correspondence between a plurality of words and information about pronunciation of each word (for example, a phoneme string).

The program storage area 1404 stores a plurality of programs for controlling various operations of the communication control apparatus 100. These programs include programs to be used for various processes described later. For example, these programs stored in a CD-ROM are installed via a CD-ROM drive (not shown), and are stored in the program storage area 1404. Further, the communication control apparatus 100 is connected to an internet, and programs downloaded via the network 2 may be stored. Although not shown, setting values or the like to be used in various processes are also stored in the HDD 104. The program related information storage area 1405 stores information about setting, initial values, data and the like that are necessary for executing the programs.

Figure 4:
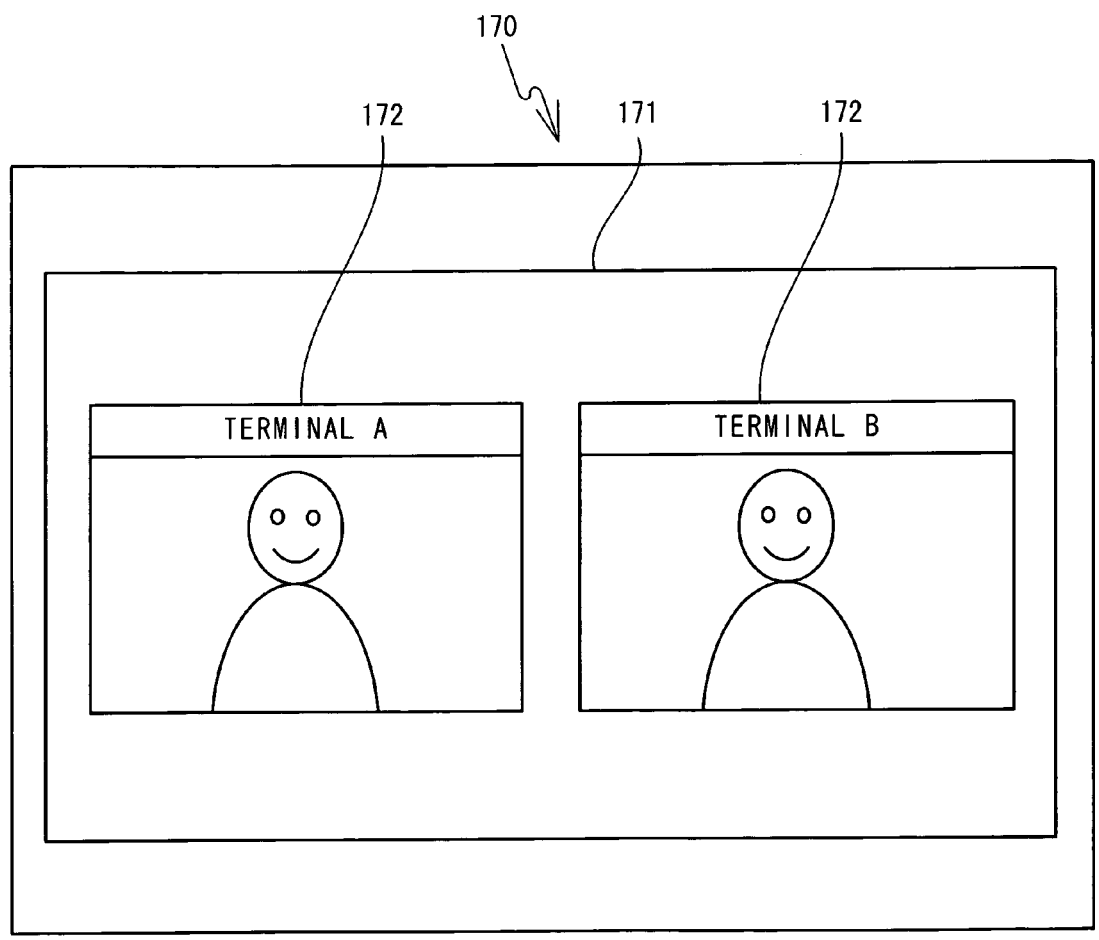
FIG. 4 is a diagram showing one concrete example of a video conference screen displayed on a monitor.

A video conference screen 171 to be displayed on the monitor 170 of the communication control apparatus 100 will be described with reference to FIG. 4.

When video conference starts, the video conference screen 171 is displayed on the monitors 170 of the communication control apparatus 100. The video conference screen 171 includes individual areas 172 of the respective communication control apparatus 100. Image data acquired by the cameras 150 of the communication control apparatus 100 (hereinafter, "camera images") are displayed on the individual areas 172. For example, the video conference screen 171 shown in FIG. 4 is provided with the individual area 172 corresponding to the communication control apparatus 100 specified as "terminal A" on a left side of the screen. Further, the individual area 172 corresponding to the communication control apparatus 100 specified as "terminal B" is provided on a right side of the video conference screen 171.

The communication control apparatus 100 receives an camera image from another communication control apparatus 100 connected to the communication control system 1. The communication control apparatus 100 that receives the camera image displays the received camera image on the individual area 172 corresponding to the communication control apparatus 100 which transmits the camera image. A camera image acquired by its self camera 150 is transmitted to the other communication control apparatus 100.

Figure 5:
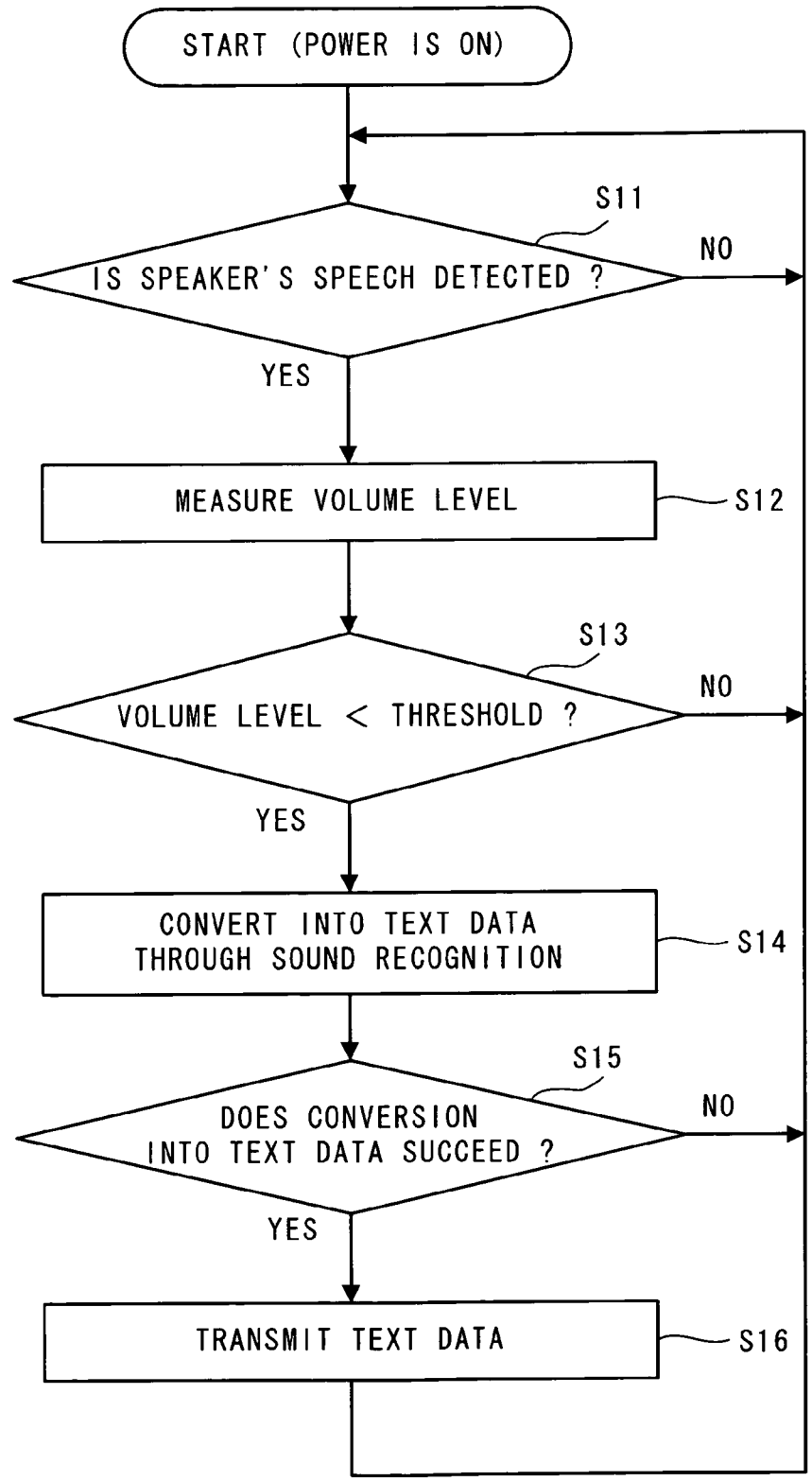
FIG. 5 is a flowchart of a main process executed by the communication control apparatus.

A main process to be executed by the communication control apparatus 100 will be described with reference to FIG. 5. The main process in FIG. 5 is executed by the CPU 101 in the communication control apparatus 100 when a program for the video conference is actuated. When a power of the communication control apparatus 100 is turned off, the main process is automatically ended. Other processes to be executed in the video conference are executed by other sequences. The camera image acquired by the camera 150 and a sound acquired by the microphone 140 are transmitted to the other communication control apparatus 100 at respective acquisition timings.

When the main process is executed, it is determined whether a speaker's speech is detected (S11). In this determining process, it is determined whether sound data acquired from the microphone 140 includes sound data of the speaker's speech. Concretely, it is determined whether a frequency of the acquired sound data is in a predetermined frequency domain. As one example, the predetermined frequency domain is 80 Hz to 1500 Hz that are the frequency domain of Japanese voice.

When sound data in the predetermined frequency domain is not detected from the acquired sound data, namely, when it is determined that the speaker's speech is not detected (S11: NO), the process goes to S11. A process for detecting the speaker's speech is executed again.

When sound data in the predetermined frequency domain is detected from the acquired sound data, namely, when it is determined that the speaker's speech is detected (S11:YES), a volume level of the acquired sound data is measured (S12). That is to say, a volume level of the speaker's voice acquired from the microphone 140 is measured. Thereafter, it is determined whether the volume level is smaller than a threshold (S13). The threshold is a value that is set in a threshold storage area (not shown) of the HDD 104 in advance. As one example, the threshold is 30 dB.

When the volume level is equal to or greater than 30 dB as the threshold (S13:NO), the process goes to S11. The process for detecting the speaker's speech is executed again.

When the volume level is smaller than 30 dB as the threshold (S13:YES), conversion from the speaker's speech into text data is carried out through the sound recognition based on the sound data (S14).

Concretely, the acoustic model, the language model and the word dictionary to be used for the sound recognition are read out from the acoustic model storage area 1401, the language model storage area 1402, and the word dictionary storage area 1403 of the HDD 104 (see FIG. 3), respectively.

The conversion from the speaker's speech into text data is carried out through the sound recognition by using the acoustic mode, the language model, and the word dictionary (S14). Any publicly-known method may be adopted as the method for sound recognition. For example, the following method can be adopted. The acoustic model is connected with reference to the word dictionary, so that an acoustic model of words is created. With reference to the language model, acoustic models of a plurality of words are connected. The process for recognizing the sound data acquired at S11 is executed by a continuous distribution HMM method based on an amount of feature of the connected acoustic models of the words. As a result, a word string related with the highest occurrence probability in the connected acoustic models of the words is output together with the occurrence probability as the recognition result. When the occurrence probability is less than a certain value, it means that the sound recognition fails. When the occurrence probability is equal to or greater than the certain value, the obtained recognition result is stored into a predetermined storage area of the RAM 103.

When the conversion of sound data into text data through the sound recognition is executed (S14), it is determined whether the conversion of the sound data into text data succeeded (S15). Concretely, the sound data is converted into text data, and it is determined whether the converted text data is stored in the predetermined storage area as the recognition result.

When the recognition result is not stored in the predetermined storage area, namely, when it is determined that the conversion of the sound data into text data did not succeed (S15:NO), the process goes to S11. The process for detecting the speaker's speech is executed again.

Figure 6:
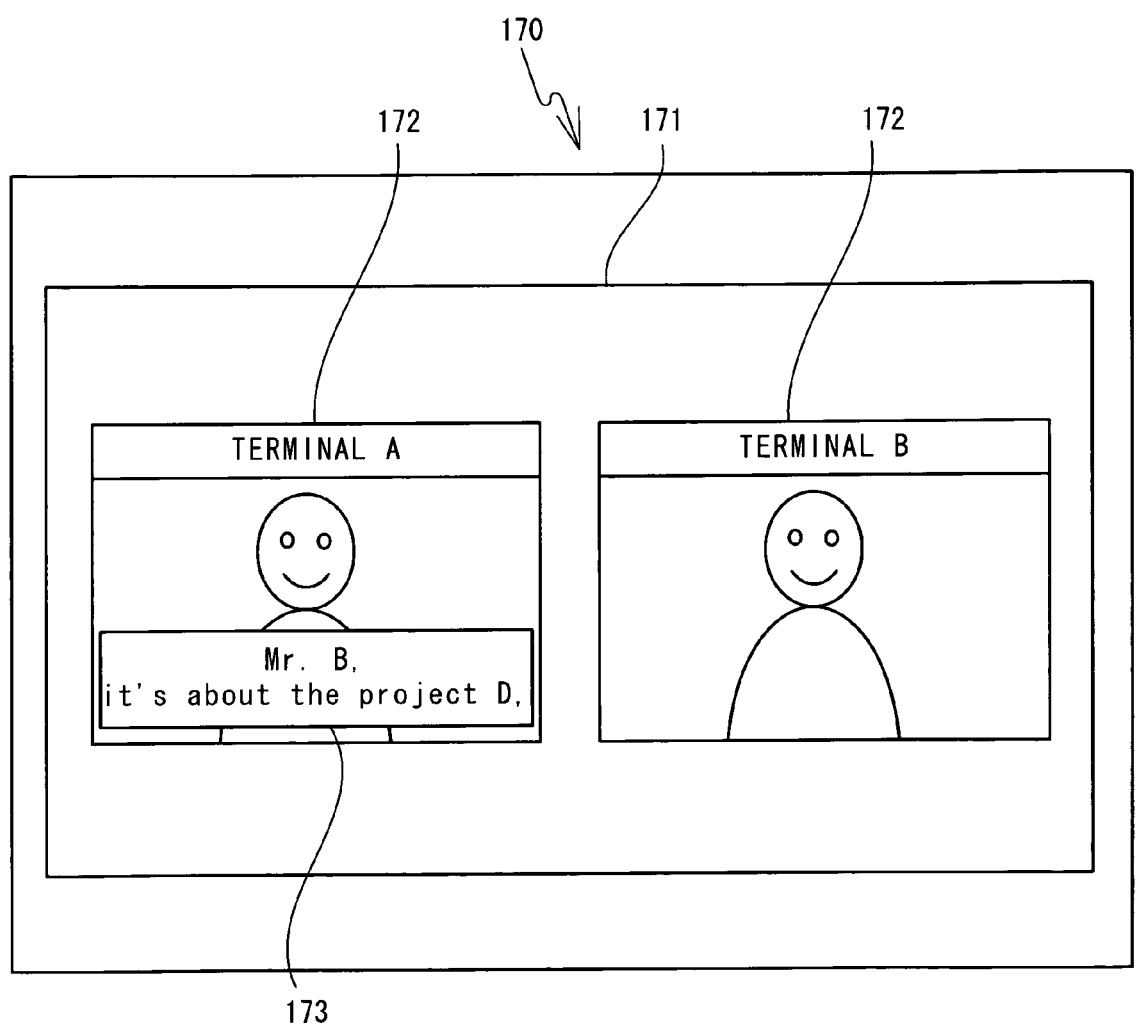
FIG. 6 is a diagram showing one concrete example of the video conference screen displayed on the monitor.

When the recognition result is stored in the predetermined storage area, namely, when it is determined that the conversion of the sound data into text data through the sound recognition succeeded (S15:YES), the text data as the recognition result stored in the predetermined storage area of the RAM 103 at S14 is transmitted to the other communication control apparatus 100 (S16). The process goes to S11, and the process for detecting the speaker's speech is executed again. Further, in the other communication control apparatus 100 to which the text data is transmitted, when the text data is received, the text data as a display text 173 is displayed on the individual area 172 corresponding to the communication control apparatus 100 as a transmission source as shown in FIG. 6. FIG. 6 shows the screen of the monitor 170 of the communication control apparatus 100 specified as "terminal B". In FIG. 6, the communication control apparatus 100 which transmits the text data to the terminal B is specified as "terminal A". The terminal B received the text data transmitted from the terminal A and displayed the text data on the individual area 172. The text data about the speaker's speech at the terminal A which is converted through the sound recognition is displayed as the display text 173.

As described above, in this embodiment, the volume level of the speaker's speech is measured in the video conference. When the volume level is smaller than the threshold, the sound recognition is executed, and text data created through the sound recognition is transmitted to the other communication control apparatus 100. In the communication control apparatus 100 that receives the text data, the received display text 173 is displayed on the individual area 172 corresponding to the communication control apparatus 100 as the transmission source. As a result, only when a speaker's voice is low and is hardly heard for listener, the text data which created from the speaker's speech by the sound recognition is transmitted to a listener's communication control apparatus 100. That is to say, the text data is transmitted to the listener only when it is necessary according to the state of the speaker's speech. For example, even when the speaker intentionally talks in a low voice, the listener can view the text data and thus does not have to turn up the volume of the sound. For this reason, a possibility that people around the listener hear the speech and a possibility of leaking of a secret can be reduced. Particularly in this embodiment, when the speaker lowers his/her voice and the volume level is less than the threshold, the transmission of text data starts from that time point. For this reason, in comparison with a case where the text data is always transmitted, the speaker's intention can be conveyed to the listener clearly. Further, since the text data is transmitted only when it is necessary, a decrease in communication efficiency can be suppressed. In this embodiment, since the text data is transmitted only when it is necessary, an image on the other side can be viewed more clearly than a case where text data is always displayed.

The present disclosure is not limited to the above-mentioned embodiment, and can be modified variously within a scope without departing from the gist of the present disclosure. Modified examples will be described below.

In the above-mentioned embodiment, text data is displayed only on the video conference screen 171 of the communication control apparatus 100 which receives the text data, but the present disclosure is not limited thereto. For example, the communication control apparatus 100 which transmits the text data may also displays the text data on its video conference screen 171. As a result, the speaker of the communication control apparatus 100 which transmits the text data can also confirm the text data, as well as the listener of the communication control apparatus 100 which receives the text data.

In the above-mentioned embodiment, sound data acquired by the microphone 140 is always transmitted to the other communication control apparatus 100 communicating under the video conference in a process other than the main process (see FIG. 5), but the present disclosure is not limited thereto. For example, when text data is transmitted to the other communication control apparatus 100, sound data does not have to be transmitted together. The main process of the communication control apparatus 100 according to this first modified example will be described with reference to FIG. 7. Since an electrical configuration of the communication control apparatus 100 according to the first modified example is similar to that in the above-mentioned embodiment, illustration and description thereof are omitted. The sound data acquired by the microphone 140 is transmitted only through the main process in FIG. 7. Since S21, S22, S24 and S26 in FIG. 7 are similar to S11, S12, S14, and S16 of the main process (see FIG. 6) in the embodiment, the description thereof is omitted.

Figure 7:
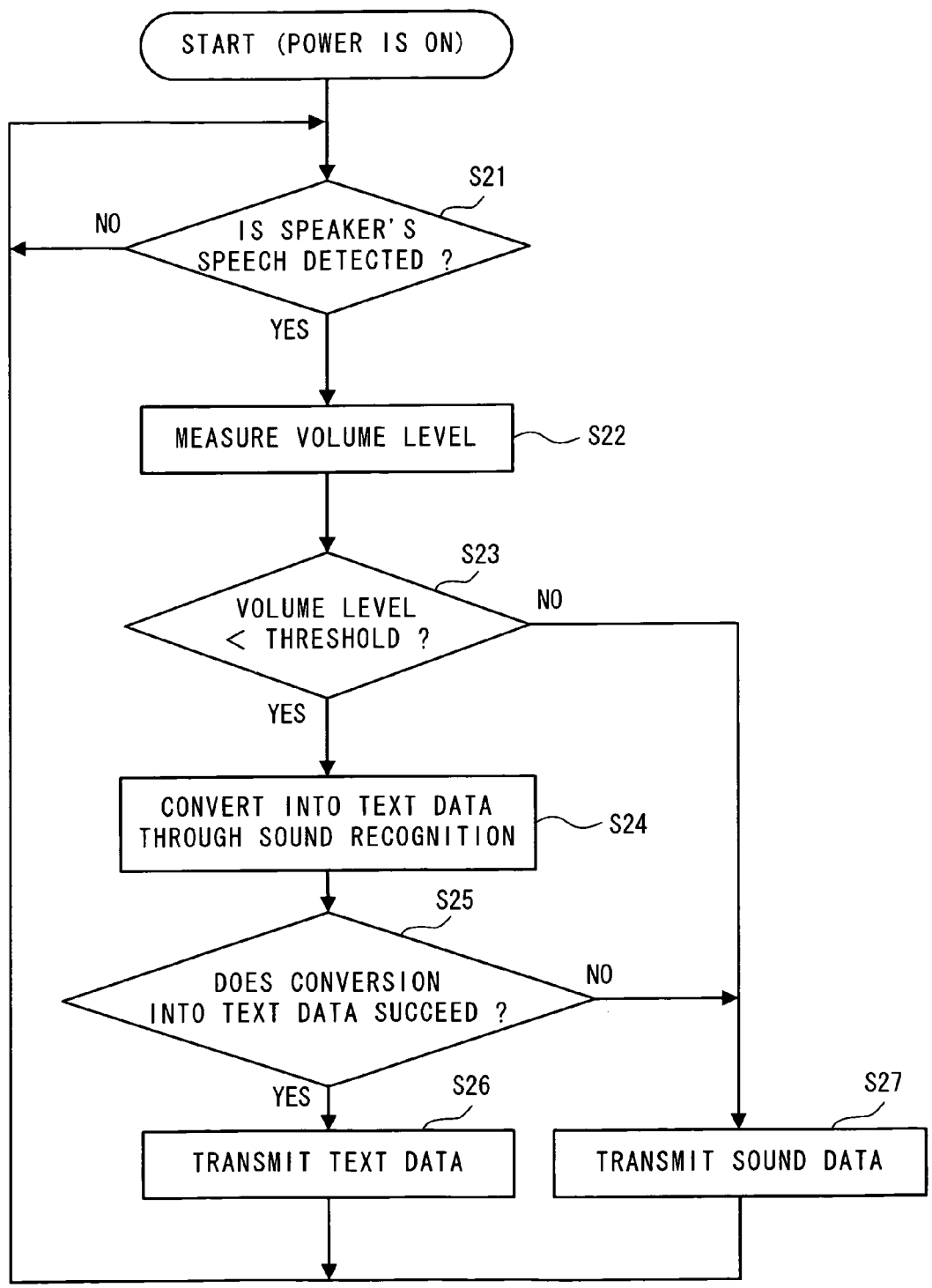
FIG. 7 is a flowchart of a main process according to a first modified example.

When the main process according to the first modified example shown in FIG. 7 is started and the volume level of the sound data is measured at S22, it is determined whether the volume level is smaller than a threshold (S23). The threshold here is 30 dB that is the same as the above-mentioned embodiment.

When the volume level is equal to or greater than 30 dB as the threshold (S23:NO), the sound data detected at S21 is transmitted to the other communication control apparatus 100 (S27). The process then goes to S21.

When the volume level is smaller than 30 dB as the threshold (S23:YES), the sound data is converted into text data through the sound recognition (S24). It is determined whether the conversion of the sound data into text data succeeds (S25). When the conversion into text data succeeds (S25:YES), the text data is transmitted to the other communication control apparatus 100 (S26). The process then goes to S21.

When it is determined that the conversion of the sound data into text data did not succeed (S25:NO), the sound data detected at S21 is transmitted to the other communication control apparatus 100 (S27). The process then goes to S21.

As described above, in the first modified example, only when the text data is not transmitted to the other communication control apparatus 100, the sound data is transmitted. That is to say, when the volume level of the sound data is smaller than the threshold, the sound data is not transmitted to the other communication control apparatus 100. As a result, when the speaker lowers his/her voice and the volume level becomes smaller than the threshold, the speaker's sound is not output from the communication control apparatus 100 on the listener's side. This prevents the volume of the communication control apparatus 100 on the listener's side from being turned up and prevents the speaker's sound from being heard by people around the listener.

In the above-mentioned embodiment, when it is determined that the volume level is smaller than the threshold, the sound data is converted into text data through the voice recognition based on the sound data, but the present disclosure is not limited thereto. For example, when a state that the volume level is smaller than the threshold continues for time T1 as the predetermined time or more, the conversion into text data through the sound recognition may be carried out based on the sound data. The process in the communication control apparatus 100 according to this second modified example will be described with reference to FIG. 8. Since an electrical configuration of the communication control apparatus 100 according to the second modified example is similar to that in the above-described embodiment, illustration and description thereof are omitted. Time T1 may be time sufficient for the determination that speaker's voice is low in the video conference, and it is set to 1 sec as one example.

Figure 8:
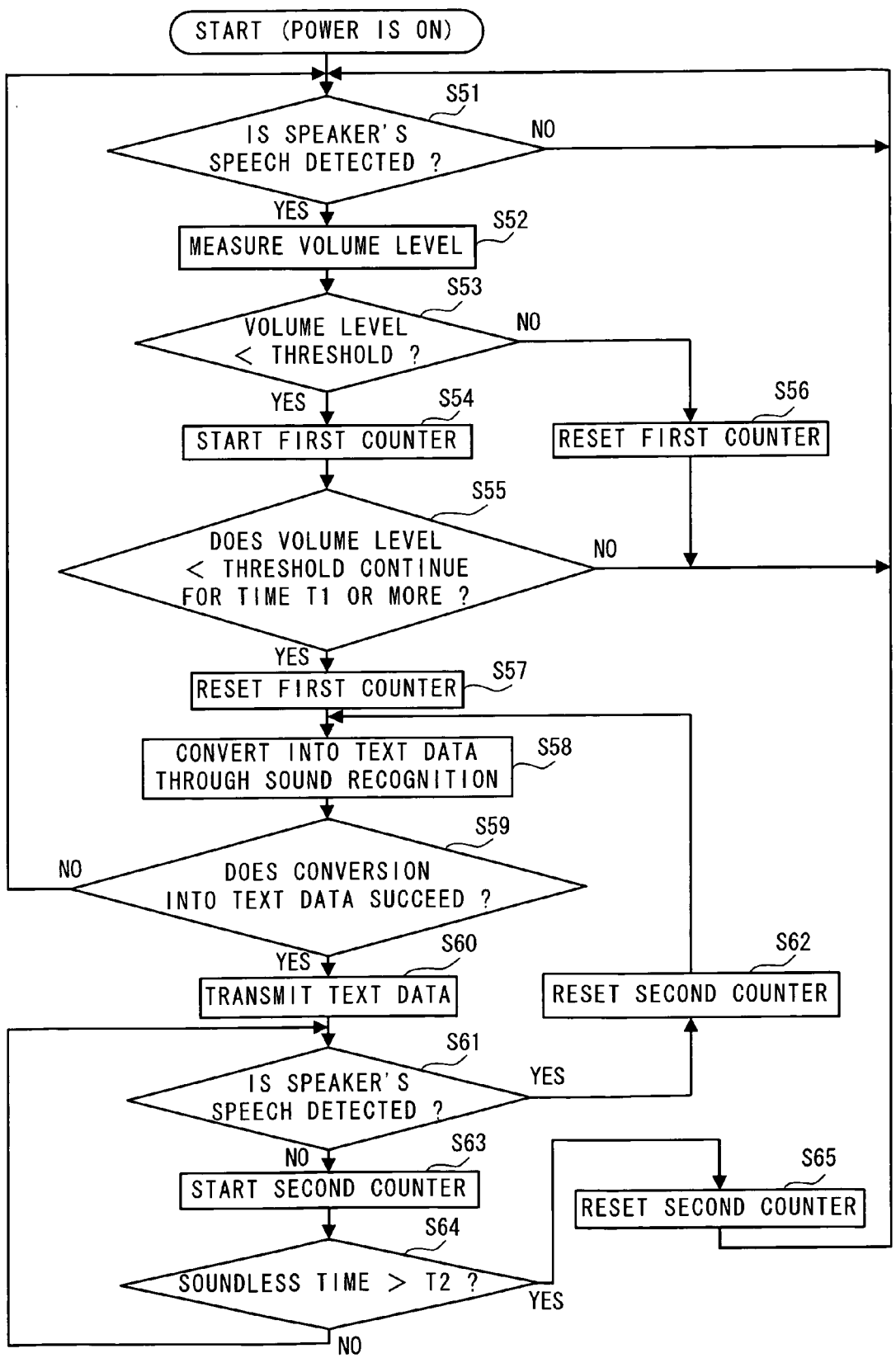
FIG. 8 is a flowchart of a main process according to a second modified example.

When the main process according to the second modified example shown in FIG. 8 is executed, it is determined whether a speaker's speech is detected (S51). Since the process at S51 is the determining process similar to S11 in the embodiment, detailed description thereof is omitted. When the speaker's speech is not detected (S51:NO), the process at S51 is repeated.

When it is determined that the speaker's speech is detected (S51:YES), the volume level of the acquired sound data is measured (S52), and it is determined whether the volume level is smaller than the threshold (S53). Since the process at S52 and S53 is the determining process similar to the determining process at S12 and S13 in the embodiment, detailed description thereof is omitted.

When the volume level is smaller than the threshold (S53:YES), counting of time starts (S54). The counting is performed by using a first counter as a timer counter. The first counter counts up based on a signal from the time counting device 106 connected to the CPU 101. When the first counter is already counting, the counting continues. When the first counter is in a stop state, the counting starts according to the process at S54.

Then, it is determined whether a state that the volume level of the sound data of the speaker's speech is smaller than the threshold continues for time T1 or more (S55). Concretely, it is determined whether the state that the time counted by the fist counter is time T1 or more. When the state that the volume level of the sound data of the speaker's speech is smaller than the threshold does not continue for time T1 or more, namely, when the time counted by the first counter is less than time T1 (S55:NO), the process goes to S51.

When the volume level is the threshold or more (S53:NO), the first counter stops and is initialized to "0" (S56). The process then goes to S51.

When the state that the volume level of the sound data of the speaker's speech is smaller than the threshold continues for time T1 or more (S55:YES), namely, when the time counted by the first counter is time T1 or more, the first counter stops and is initialized to "0" (S57). The conversion into text data through the sound recognition is carried out based on the sound data (S58). The sound data that is converted into text data through the sound recognition is the sound data that is acquired in a period between when the counting in the first counter at S54 starts and when the state that the volume level of the sound data is smaller than the threshold continues for time T1 or more. Since the process from S58 to S60 is similar to the process from S14 to S16 in the embodiment, detailed description thereof is omitted. When it is determined that the conversion of the sound data into text data did not succeed (S59:NO), the process goes to S51.

When it is determined that the conversion of the sound data into text data succeeds (S59:YES), the text data is transmitted to the other communication control apparatus 100 (S60). Then it is determined whether the speaker's speech is detected (S61). Since the process at S61 is similar to the process at S51, detailed description thereof is omitted.

When it is determined that the speaker's speech is not detected (S61:NO), the counting of time during which the speaker's speech is not detected starts (S63). This counting is performed by using a second counter as the timer counter. The second counter counts up based on a signal from the time counting device 106 connected to the CPU 101. When the second counter is already counting, the counting continues, and when the second counter is in a stop state, the counting is started by the process at S63.

Then, it is determined whether soundless time continues for time T2 or more (S64). The soundless time is time during which the sound data of the speaker's speech is not detected, and which is counted by the second counter. Time T2 may be a time length during which the end of the speaker's speech can be determined, and is set to 3 sec as one example.

Just after the counting of the soundless time is started by the second counter at S63, the soundless time is less than time T2 (S64:NO). For this reason, the process goes to S61, and it is determined again whether the speaker's speech is detected.

When it is determined that the speaker's speech is not detected and the soundless time continues for time T2 or more (S64:YES), namely, when the time counted by the second counter is time T2 or more, the second counter stops, and is initialized to "0"(S65). The process then goes to S51.

When the speaker's speech is detected while the second counter is counting the soundless time (S61:YES), namely, when the speaker's speech is detected until the soundless time elapses time T2, the second counter stops and is initialized to "0"(S62). The process then goes to S58, and the sound data is converted into text data. The sound data, which is detected in a period between when the counting in the second counter starts at S63 and when the time counted by the second counter is time T2 or more, is converted into text data.

As described above, in the second modified example, it is determined whether the state that the volume level is smaller than the threshold continues for time T1 or more. When it is determined that the state that the volume level is smaller than the threshold continues for time T1 or more, the text data created through the sound recognition is transmitted to the other communication control apparatus 100. When the speaker intentionally lowers his/her voice, the state of low voice is generally maintained for certain time or more. Therefore, when the speaker's voice is temporarily low during his/her speech, the transmission of the text data created from low voice can be prevented.

In the above-mentioned embodiment, it is determined that the conversion of the sound data into text data did not succeed (S15:NO), the process goes to S11. The process for detecting the speaker's speech is again executed, but the present disclosure is not limited thereto. For example, when the conversion of the sound data into text data fails, a signal of the sound data may be amplified so that the conversion into text data through the sound recognition is again performed. The main process in the communication control apparatus 100 according to this third modified example will be described with reference to FIG. 9. Since an electrical configuration of the communication control apparatus 100 according to the third modified example is similar to that in the above-mentioned embodiment, illustration and description thereof is omitted. In the main process of FIG. 9, since the process from S71 to S74 is similar to the process from S11 to S14 in FIG. 5, description thereof is omitted.

Figure 9:
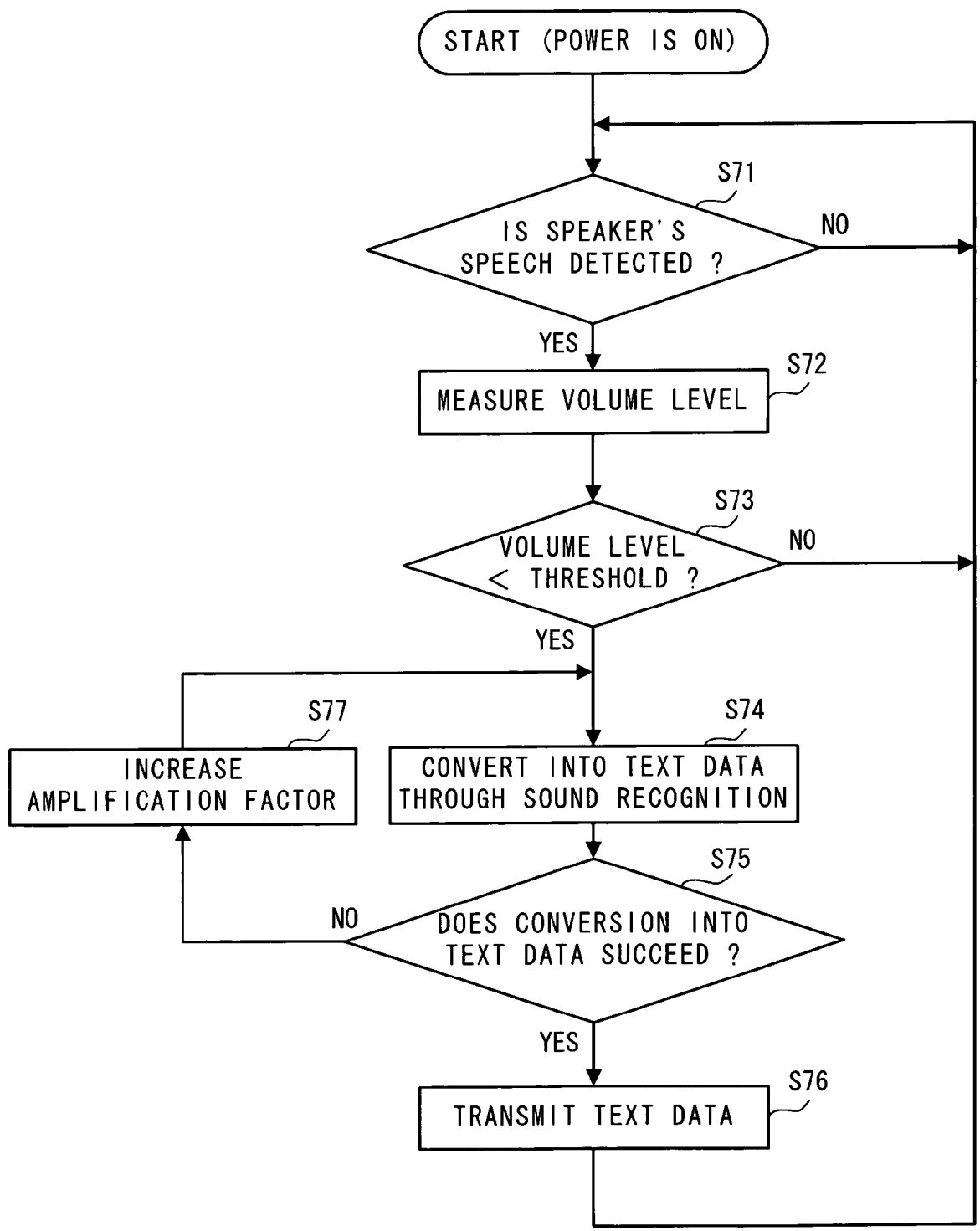
FIG. 9 is a flow chart of a main process according to a third modified example.

In the main process according to the third modified example shown in FIG. 9, when it is determined that the conversion of the sound data into text data did not succeed (S75:NO), concretely when the sound data is converted into text data but an obtained value of the occurrence probability is less than a certain value, the signal of the sound data is amplified (S77). That is to say, the signal of the sound data acquired by the microphone 140 is amplified. Then, the conversion into text data is again performed through the sound recognition based on the sound data whose signal is amplified (S74). The process goes to S75, and it is determined whether the conversion of the sound data whose signal is amplified into text data succeeds. That is to say, the process at S77 and S74 is executed until the conversion of the sound data into text data succeeds at S75.

When it is determined that the conversion of the sound data into text data succeeds (S75:YES), the text data as the recognition result stored in the predetermined storage area of the RAM 103 is transmitted to the other communication control apparatus 100 (S76). The process then goes to S71.

In the third modified example, when it is determined that the volume level is smaller than the threshold, the conversion from the sound data into text data through the sound recognition is performed. However, further it is determined whether creation of text data succeeded. When it is determined that the creation of the text data did not succeed, the signal of the sound data is amplified for the sound recognition. The amplified sound data is used only for the sound recognition, and not used for comparing with the threshold. The sound recognition for the amplified sound data is performed and text data is created. As a result, even when the speaker talks in low voice, the conversion from the speaker's voice into text data through the sound recognition is more likely to succeed.

In the third modified example, when the conversion into text data through the sound recognition did not succeed, the process at S77 and S74 is repeated, but the present disclosure is not limited thereto. For example, when the repetition of this process at a predetermined number of times does not result in the success in the conversion into text data, the process goes to S71, and the process for detecting the speaker's speech may be again executed.

In the above-mentioned embodiment, when it is determined that the sound data is successfully converted into text data (S15:YES), the created text data is always transmitted to the other communication control apparatus 100, but the present disclosure is not limited thereto. For example, users of the respective communication control apparatus 100 who take part in the video conference are registered in advance. If a person who is not registered in the communication control apparatus 100 is caught by its camera 150, the text data may be prevented from being transmitted to that communication control apparatus 100. The process in the communication control apparatus 100 according to a fourth modified example will be described with reference to FIGS. 10 to 13. Since an electrical configuration of the communication control apparatus 100 according to the fourth modified example is similar to that in the above-described embodiment, illustration and description thereof are omitted.

Figure 10:
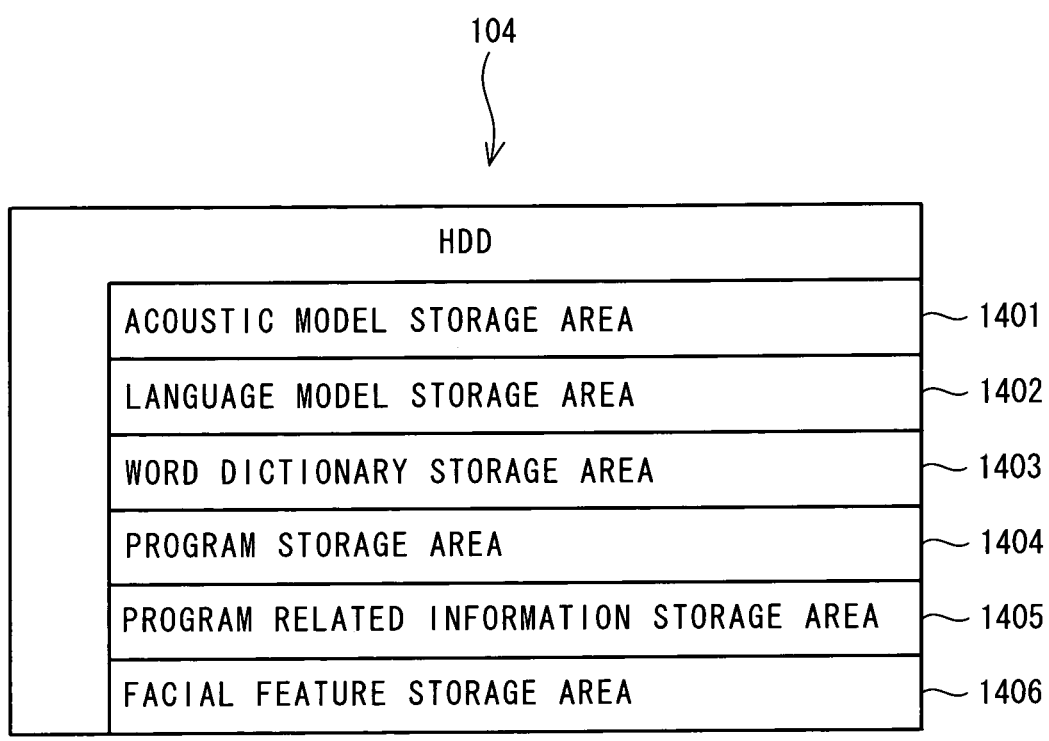
FIG. 10 is a pattern diagram showing a constitution of a storage area of HDD of the communication control apparatus according to a fourth modified example.

A structure of the HDD 104 of the communication control apparatus 100 will be described with reference to FIG. 10. A plurality of storage areas are provided to the HDD 104 as a storage device. In the fourth modified example, in addition to the plural storage areas in the above-mentioned embodiment, a facial feature storage area 1406 in which a facial feature table 1400 (see FIG. 11) is stored is provided.

The facial feature table 1400 will be described with reference to FIG. 11. Facial feature data and related information are related with each other so as to be stored in the facial feature table 1400 in correspondence with each information for specifying the communication control apparatus 100 performing communication in the communication control system 1 (hereinafter "terminal ID"). The facial feature data represents facial features of persons, and the related information relates to the person. For example, a terminal ID field, a user ID field, a facial feature data field, and a name field are provided to the facial feature table 1400. The facial feature table 1400 is stored in the respective communication control apparatus 100 before video conference takes place.

The terminal ID field stores terminal IDs of the communication control apparatus 100 performing communication in the communication control system 1. The user ID field stores user IDs as information for identifying participants of the video conference. The facial feature data field stores numerical value data representing positions and shapes of eyebrows, eyes, noses, mouths and the like, as the facial feature data. In the fourth modified example, data about feature points corresponding to the eyes, noses and mouths are adopted as the facial feature data. Names of people as sources whose facial feature data are extracted (hereinafter, "registrants") are stored in the name field.

Figure 12:
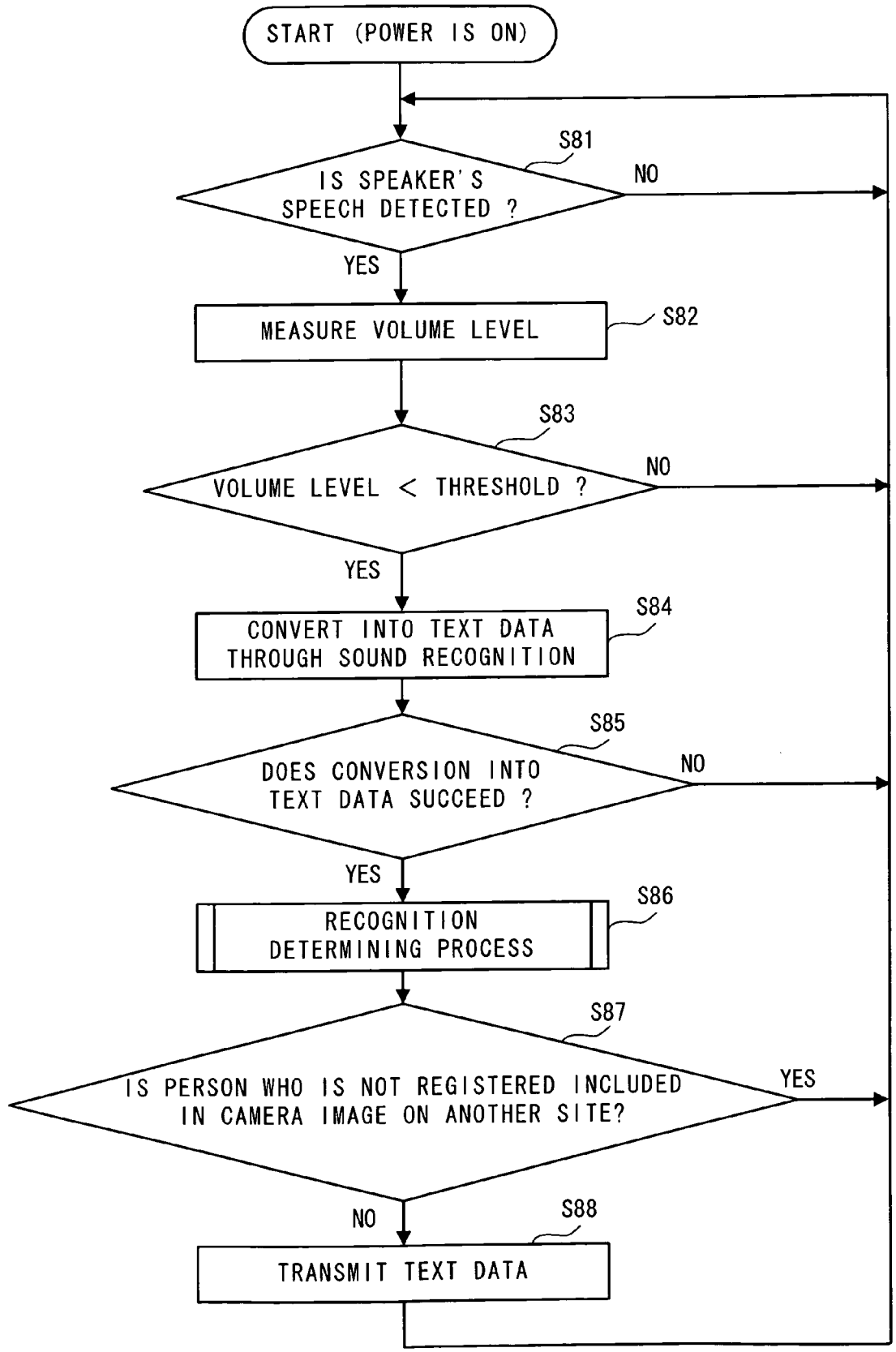
FIG. 12 is a flowchart of a main process according to the fourth modified example.

Description will be given of a main process in the communication control apparatus 100 according to the fourth modified example with reference to FIG. 12. The main process in the communication control apparatus 100 in FIG. 12 is executed by the CPU 101 when the program for the video conference in the communication control apparatus 100 is actuated. In the main process in FIG. 12, since the process from S81 to S85 is similar to the process from S11 to S15 in FIG. 5, description thereof is omitted.

In the fourth modified example, the camera image acquired by the cameras 150 of the communication control apparatus 100 is transmitted to the other communication control apparatus 100 every predetermined time. The other communication control apparatus 100 receives the transmitted camera image in a process other than the main process. The received camera image is stored into a camera image storage area (not shown) of the RAM 103. The camera image is updated every predetermined time.

When the main process according to the fourth modified example shown in FIG. 12 is executed and it is determined that the conversion into text data through the sound recognition succeeds (S85:YES), the recognition determining process is executed (S86).

Figure 13:
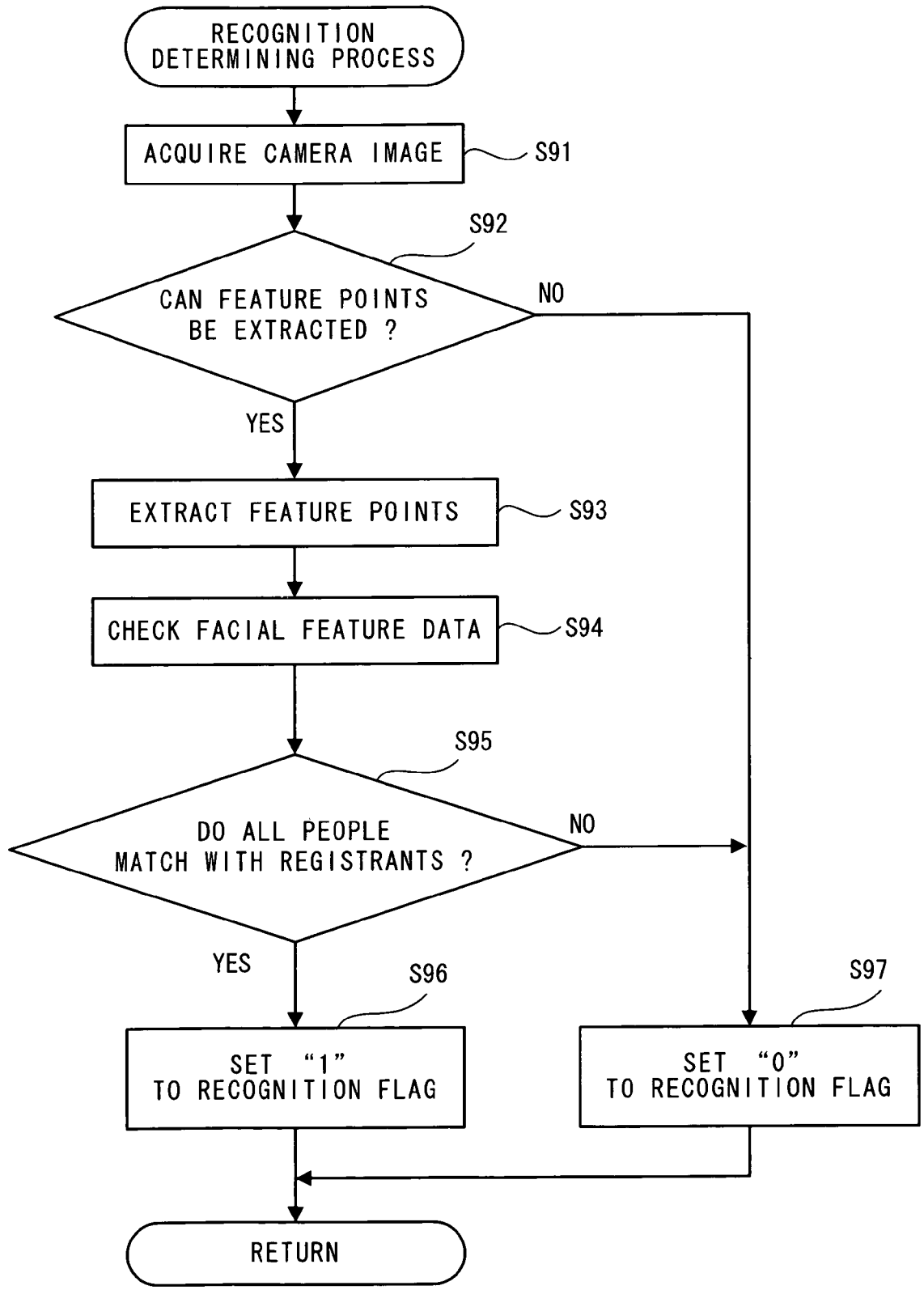
FIG. 13 is a flowchart of a sub-routine of a recognition determining process executed in the main process according to the fourth modified example.

The recognition determining process will be described with reference to FIG. 13. When the recognition determining process is executed, a camera image is acquired (S91). The camera image is image data that is stored in the camera image storage area (not shown) of the RAM 103 and is transmitted from the other communication control apparatus 100. The received camera image is stored in association with the terminal ID of the communication control apparatus 100 that transmits the camera image.

Then, it is determined whether facial feature points can be extracted from the camera image (S92). Only when all feature points of eyes, nose and mouth can be extracted, it is determined that the facial feature points can be extracted (S92: YES). When the facial feature points are extracted, a facial area of a person in the camera image is detected. For extracting the facial feature points, for example, a method for matching the facial area with a facial pattern stored in advance, a method for detecting a skin color area can be adopted for the detection of the facial area, Or any other publicly-known method may be adopted. The feature points of eyes, nose and mouth as the facial feature points are extracted from the facial area, and numerical value data representing their positions and shapes are extracted as the facial feature data about the participants (S93).

The facial feature data about the registrants are sequentially loaded from the facial feature table 1400 stored in the facial feature storage area 1406 of the HDD 104, and are checked against the facial feature data of all the people included in the camera images (S94). At this time, the facial feature data corresponding to the terminal ID identical to the terminal ID corresponding to the camera image stored in the camera image storage area is acquired. As a result of the check, when it is determined that a person who is not identical to the registrants is included in the facial feature data of all the people in the camera image (S95:NO), "0" is set to a recognition flag stored in a recognition flag storage area of the RAM 103 (S97). The recognition determining process is ended, and the process returns to the main process shown in FIG. 12.

On the other hand, when it is determined that all the people in the camera image are identical to the registrants (S95: YES), "1" is set to the recognition flag stored in the recognition flag storage area of the RAM 103 (S96). The recognition determining process is ended, and the process returns to the main process shown in FIG. 12.

When it is determined at S92 that at least one of the feature points of eyes, nose and mouth cannot be extracted from the facial area (S92:NO), the process goes to S97, and "0" is set to the recognition flag. The recognition determining process is ended, and the process returns to the main process shown in FIG. 12.

When the recognition determining process is ended, the process returns to the main process shown in FIG. 12, and it is determined whether a person who does not match with the registrants is included in all the people in the camera image acquired by the other communication control apparatus 100 (S87). This recognition determining process is determined based on the value of the recognition flag stored in the recognition flag storage area (not shown) of the RAM 103.

When the value of the recognition flag stored in the RAM 103 is "1", namely, when it is determined that a person who does not match with the registrants is not included in all the people in the camera images acquired by the other communication control apparatus 100 (S87:NO), text data is transmitted to the other communication control apparatus 100 (S88). The process goes to S81, and the process for detecting the speaker's speech is again executed. The text data is data about the recognition result stored in the predetermined storage area of the RAM 103 at S84.

When the value of the recognition flag stored in the RAM 103 is "0", namely, when it is determined that a person who is not identical to the registrants is included in all the people in the camera image acquired by the other communication control apparatus 100 (S87:YES), the process goes to S81, and the process for detecting the speaker's speech is again executed. That is to say, the text data is not transmitted to the other communication control apparatus 100, and the process goes to S81.

In the fourth modified example, the information in which the terminal IDs are related with the facial feature data as the facial features of the participants of the video conference is acquired from the facial feature table 1400 stored in the facial feature storage area 1406. The facial feature data about the people in the camera image acquired from the other communication control apparatus 100 are extracted. When it is determined that all the facial feature data extracted from the camera image are present in the facial feature data stored in the facial feature table 1400, text data is transmitted to the communication control apparatus 100 on the listener's side that transmits the camera image. As a result, when a person who is not registered in the video conference is displayed on the communication control apparatus 100 on the other side to which the text data is transmitted, the text data is not transmitted. As a result, even when a condition that the text data is transmitted when the volume level is smaller than a sound standard value holds, the person who is not registered in the video conference on the other side can be prevented from viewing the text data.

Figure 14:
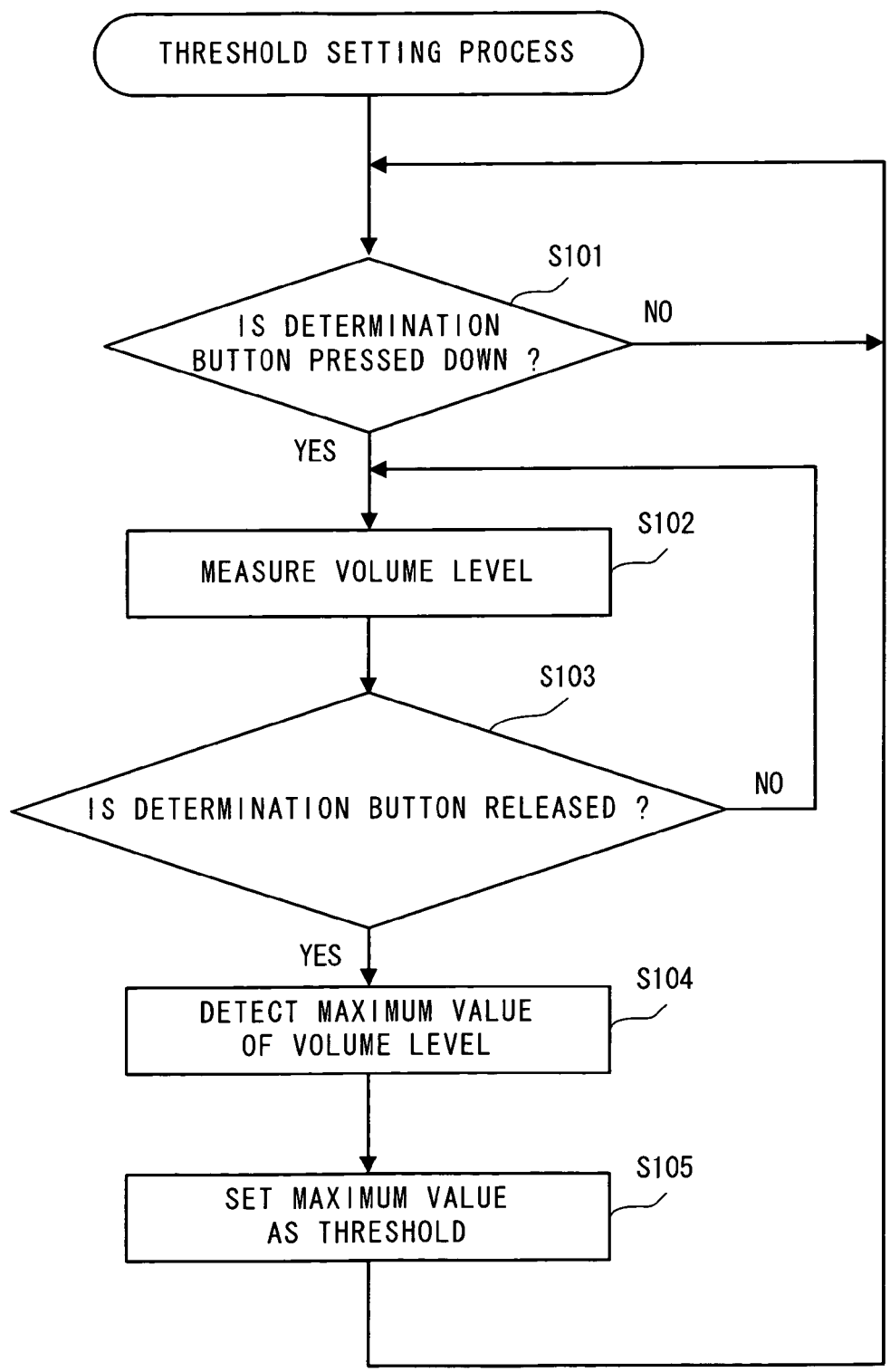
FIG. 14 is a flowchart of a sub-routine of a threshold setting process according to a fifth modified example.

In the above-mentioned embodiment, a fixed value set in advance is used as the threshold to be used for the determination at S13, but the threshold is not limited to this value. For example, the user of the communication control apparatus 100 may set the threshold. Description will be given of a threshold setting process in the communication control apparatus 100 according to a fifth modified example with reference to FIG. 14. The threshold setting process in FIG. 14 is executed in a process different from the main process (see FIG. 5). The other processes are similar to those in the above-mentioned embodiment, description thereof is omitted.

When the threshold setting process is executed, it is determined whether a determination button (not shown) is pressed down (S101). The determination button is a button allocated to the keyboard 120. When the determination button is not pressed down (S101:NO), the process goes to S101.

When the determination button is pressed down (S101:YES), the volume level of sound data input by the user via the microphone 140 is measured (S102). The measured volume level is stored into the volume level storage area (not shown) of the RAM 103. Then, it is determined whether the pressed-down state of the determination button is released (S103). Concretely, it is determined whether the user removes his/her finger from the determination button.

When it is determined that the pressed-down state of the determination button is not released (S103:NO), the process goes to S102, and the volume level is again measured. That is to say, while the user is pressing down the determination button, the volume level is always measured, the values of the measured volume level is sequentially stored into the volume level storage area.

When it is determined that the pressed-down state of the determination button is released (S103:YES), a maximum value of the volume level stored in the volume level storage area is detected (S104). The maximum value of the volume level detected at S104 is stored as the threshold into the threshold storage area of the HDD 104 (S105). The process then goes to S101.

As described above, in the fifth modified example, while the determination button is being pressed down, the maximum value of the volume level of the sound data input through the microphone 140 is detected. The detected maximum value is set as the threshold. As a result, the user can set a volume of his/her normal voice and the threshold in advance, according to the performance of the microphone 140.

What is claimed is:

1. A first communication control apparatus configured to communicate sound data and image data with a second communication control apparatus via a network, comprising:
   a processor; and
   a memory storing computer-readable instructions therein, the computer-readable instructions, when executed by the processor, instructing the processor to perform:
   measuring a volume level of sound data input from a sound input device of the first communication control apparatus;
   first determining whether the volume level measured by the measuring is smaller than a predetermined standard volume level;
   first creating text data from the sound data by sound recognition in response to a result of the first determining indicating that the volume level is smaller than the predetermined standard volume level; and
   first transmitting the text data created by the first creating to the second communication control apparatus.

2. The first communication control apparatus according to claim 1, wherein
   the computer-readable instructions, when executed by the processor, instruct the processor to further perform:
   second transmitting the sound data input from the sound input device to the second communication control apparatus in response to a result of the first determining indicating that the volume level is equal to or greater than the standard volume level.

3. The first communication control apparatus according to claim 1, wherein
   the computer-readable instructions, when executed by the processor, instruct the processor to further perform:
   second determining whether a state that the volume level measured by the measuring is smaller than the standard volume level continues for a predetermined time,
   wherein the first transmitting comprises transmitting the text data to the second communication control apparatus in response to a result of the second determining indicating that the state that the volume level is smaller than the standard volume level continues for the predetermined time.

4. The first communication control apparatus according to claim 1, wherein
   the computer-readable instructions, when executed by the processor, instruct the processor to further perform:
   third determining whether the first creating is capable of creating the text data in response to the result of the first determining indicating that the volume level is smaller than the standard volume level;
   increasing an amplification factor of the sound data input from the sound input device in response to a result of the third determining indicating that the first creating is incapable of creating the text data; and
   second creating the text data based on the sound data which is amplified based on the increased amplification factor by the increasing.

5. The first communication control apparatus according to claim 1, wherein
   the computer-readable instructions, when executed by the processor, instruct the processor to further perform:

receiving image data input from an image input device of the second communication control apparatus;

extracting second facial features as facial features of at least one person included in the image data received by the receiving;

acquiring participant information including identification information of the second communication control apparatus from a participant information storage device, wherein the participant information storage device stores participant information for at least one communication control apparatus, including the second communication control apparatus, communicating with the first communication control apparatus, wherein the participant information for each of the at least one communication control apparatus includes identification information of the communication control apparatus and first facial features indicating facial features of at least one person; and fourth determining whether all the second facial features are present in the first facial features of the participant information for the second communication control apparatus, wherein, the first transmitting comprises transmitting the text data to the second communication control apparatus in response to a result of the fourth determining indicating that all the second facial features are present in the first facial features.

6. The first communication control apparatus according to claim 1, wherein the computer-readable instructions, when executed by the processor, instruct the processor to further perform:

instructing to detect the sound data;

detecting a maximum value of the volume level of the sound data input from the sound input device within a time specified by the instructing; and setting the maximum value detected by the detecting as the predetermined standard volume level.

7. A communication control method performed by a first communication control apparatus configured to communicate sound data and image data with a second communication control apparatus via a network, comprising:

measuring a volume level of sound data input from a sound input device of the first communication control apparatus;

first determining whether the volume level measured by the measuring is smaller than a predetermined standard volume level;

first creating text data from the sound data by sound recognition in response to a result of the first determining indicating that the volume level is smaller than the predetermined standard volume level; and first transmitting the text data created by the first creating to the second communication control apparatus.

8. A non-transitory computer-readable medium storing a computer-readable instructions therein that, when executed by a processor of a first communication control apparatus, instruct the processor to perform:

measuring a volume level of sound data input from a sound input device of the first communication control apparatus;

first determining whether the volume level measured by the measuring is smaller than a predetermined standard volume level;

first creating text data from the sound data by sound recognition in response to a result of the first determining indicating that the volume level is smaller than the predetermined standard volume level; and first transmitting the text data created by the first creating to a second communication control apparatus configured to communicate sound data and image data with the first communication control apparatus via a network.

9. The first communication control apparatus according to claim 2, wherein the second transmitting comprises not transmitting the sound data to the second communication control apparatus in response to the result of the first determining indicating that the volume level is smaller than the standard volume level.

10. The communication control method according to claim 7, further comprising:

second transmitting the sound data input from the sound input device to the second communication control apparatus in response to a result of the first determining indicating that the volume level is equal to or greater than the standard volume level.

11. The communication control method according to claim 10, further comprising:

the second transmitting comprises not transmitting the sound data to the second communication control apparatus in response to the result of the first determining indicating that the volume level is smaller than the standard volume level.

12. The communication control method according to claim 7, further comprising:

second determining whether a state that the volume level measured by the measuring is smaller than the standard volume level continues for a predetermined time, wherein the first transmitting comprises transmitting the text data to the second communication control apparatus in response to a result of the second determining indicating that the state that the volume level is smaller than the standard volume level continues for the predetermined time.

13. The communication control method according to claim 7, further comprising:

third determining whether the first creating is capable of creating the text data in response to the result of the first determining indicating that the volume level is smaller than the standard volume level;

increasing an amplification factor of the sound data input from the sound input device in response to a result of the third determining indicating that the first creating is incapable of creating the text data; and second creating the text data based on the sound data which is amplified based on the increased amplification factor by the increasing.

14. The communication control method according to claim 7, further comprising:

instructing to detect the sound data;

detecting a maximum value of the volume level of the sound data input from the sound input device within a time specified by the instructing; and setting the maximum value detected by the detecting as the predetermined standard volume level.

15. The non-transitory computer-readable medium according to claim 8, wherein the computer-readable instructions, when executed by the processor, instruct the processor to further perform:

second transmitting the sound data input from the sound input device to the second communication control apparatus in response to a result of the first determining indicating that the volume level is equal to or greater than the standard volume level.

16. The non-transitory computer-readable medium according to claim 15, wherein
the second transmitting comprises not transmitting the sound data to the second communication control apparatus in response to the result of the first determining indicating that the volume level is smaller than the standard volume level.

17. The non-transitory computer-readable medium according to claim 8, wherein the computer-readable instructions, when executed by the processor, instruct the processor to further perform:
second determining whether a state that the volume level measured by the measuring is smaller than the standard volume level continues for a predetermined time,
wherein the first transmitting comprises transmitting the text data to the second communication control apparatus in response to a result of the second determining indicating that the state that the volume level is smaller than the standard volume level continues for the predetermined time.

18. The non-transitory computer-readable medium according to claim 8, wherein the computer-readable instructions, when executed by the processor, instruct the processor to further perform:
third determining whether the first creating is capable of creating the text data in response to the result of the first determining indicating that the volume level is smaller than the standard volume level;
increasing an amplification factor of the sound data input from the sound input device in response to a result of the third determining indicating that the first creating is incapable of creating the text data; and
second creating the text data based on the sound data which is amplified based on the increased amplification factor by the increasing.

19. The non-transitory computer-readable medium according to claim 8, wherein the computer-readable instructions, when executed by the processor, instruct the processor to further perform:
receiving image data input from an image input device of the second communication control apparatus;
extracting second facial features as facial features of at least one person included in the image data received by the receiving;
acquiring participant information including identification information of the second communication control apparatus from a participant information storage device, wherein the participant information storage device stores participant information for at least one communication control apparatus, including the second communication control apparatus, communicating with the first communication control apparatus, wherein the participant information for each of the at least one communication control apparatus includes identification information of the communication control apparatus and first facial features indicating facial features of at least one person; and
fourth determining whether all the second facial features are present in the first facial features of the participant information for the second communication control apparatus,
wherein, the first transmitting comprises transmitting the text data to the second communication control apparatus in response to a result of the fourth determining indicating that all the second facial features are present in the first facial features.

20. The non-transitory computer-readable medium according to claim 8, wherein the computer-readable instructions, when executed by the processor, instruct the processor to further perform:
instructing to detect the sound data;
detecting a maximum value of the volume level of the sound data input from the sound input device within a time specified by the instructing; and
setting the maximum value detected by the detecting as the predetermined standard volume level.

* * * * *